United States Patent
Millard et al.

(10) Patent No.: US 6,175,315 B1
(45) Date of Patent: Jan. 16, 2001

(54) AIRCRAFT TAKEOFF ACCELERATION INDICATOR SYSTEM

(76) Inventors: Wayne C. Millard; Carl W. Millard, both of Hangar #5, Bay #1, Pearson International Airport, 2450 Derry Road East, Mississauga, ON (CA), L5S 1B2

(*) Notice: Under 35 U.S.C. 154(b), the term of this patent shall be extended for 0 days.

(21) Appl. No.: 09/180,473

(22) PCT Filed: Oct. 22, 1997

(86) PCT No.: PCT/CA97/00785

§ 371 Date: Nov. 10, 1998

§ 102(e) Date: Nov. 10, 1998

(87) PCT Pub. No.: WO98/47056

PCT Pub. Date: Oct. 22, 1998

(30) Foreign Application Priority Data

Apr. 11, 1997 (CA) .................................................. 2202409

(51) Int. Cl.⁷ .................................................. G08B 21/00

(52) U.S. Cl. .................. 340/959; 73/178 T; 340/978; 701/15

(58) Field of Search ............................ 73/178 T; 701/15; 340/959, 945, 973, 971, 978

(56) References Cited

U.S. PATENT DOCUMENTS

| | | | |
|---|---|---|---|
| 2,922,982 | 1/1960 | Hoekstra | 340/959 |
| 3,025,494 | 3/1962 | Andresen, Jr. | |
| 3,128,445 | 4/1964 | Hosford | 73/178 T |
| 3,182,498 | 5/1965 | Koletsky et al. | 73/178 T |
| 3,192,503 * | 6/1965 | Lang | 340/959 |
| 3,621,210 * | 11/1971 | Canning | 340/978 |
| 3,863,204 | 1/1975 | Hoekstra . | |
| 4,130,015 | 12/1978 | Grover | 73/178 T |
| 4,251,868 * | 2/1981 | Aron et al. | 340/959 |
| 4,638,437 * | 1/1987 | Cleary et al. | 340/959 |
| 4,837,695 * | 6/1989 | Baldwin | 73/178 T |
| 4,980,833 | 12/1990 | Milligan et al. | 73/178 T |
| 5,103,224 * | 4/1992 | Arad | 340/959 |
| 5,124,700 | 6/1992 | Bonafé et al. | 340/959 |
| 5,353,022 | 10/1994 | Middleton et al. | 340/959 |
| 5,499,025 | 3/1996 | Middleton et al. | 340/959 |

* cited by examiner

*Primary Examiner*—Brent A. Swarthout
(74) *Attorney, Agent, or Firm*—Eugene J. A. Gierczak

(57) ABSTRACT

An aircraft instrument system that informs the pilot of whether, during the takeoff roll, the aircraft's acceleration rate is sufficient to ensure that V1 speed will be achieved at the expected time (and thus distance), and, if not, how far in distance the aircraft is lagging behind the required acceleration schedule.

10 Claims, 4 Drawing Sheets

SCHEMATIC OF HOWGOZIT AIRSPEED INDICATOR SYSTEM

HOWGOZIT AIRSPEED INDICATOR

AIRCRAFT TAKEOFF ACCELERATION INDICATOR SYSTEM

BACKGROUND

This invention relates to monitoring an aircraft's acceleration during the takeoff roll up to V1 speed.

Aircraft are certificated by a State's aeronautical licensing authority; such as, the United States Federal Aviation Agency, Transport Canada, the British Air Registration Board, or the European Joint Aviation Authority.

One of the certification requirements involves the aircraft having adequate takeoff performance, such that, with all engines operating, within the available runway distance, the aircraft is capable of accelerating from a standstill to the takeoff decision speed (commonly referred to as the V1 speed or the Go-NoGo speed), where, in the event of an engine failure, the aircraft is capable of either continuing the takeoff safely, or, rejecting the takeoff and stopping within the remaining runway distance available.

The takeoff acceleration is dependent upon eight primary criteria, namely, a) All-Up Gross Weight of the Aircraft
b) Altitude of the Airfield,
c) Outside Air Temperature,
d) Runway Slope,
e) Wind Component,
f) Engine Power Setting,
g) Wing Flap Setting, and
h) Runway Contaminants; such as, snow, slush, and standing water.

Aircraft manufacturers produce takeoff performance graphs which, when entered with the appropriate criteria, will show the V1 speed and the runway distance required. During takeoff, the aircraft must maintain an acceleration rate such that V1 will be achieved at, or within, the graphed distance.

Let us consider the position of the pilot who has taxied out from the departure gate and has lifted up on the takeoff runway. He knows his V1 speed, and his runway distance required. He commences the takeoff roll. He experiences acceleration that seems satisfactory, but there is no instrumentation system provided to him that directly tells him if the rate of acceleration is in fact satisfactory—that remains, to this day, a "seat of the pants" acquired skill.

Many factors can insidiously retard the required takeoff acceleration rate which may result in having inadequate distance for takeoff, or inadequate distance for the accelerate-stop situation.

Some of the factors that may insidiously retard the required takeoff acceleration rate are: runway contaminants more severe than expected, erroneous engine pressure ratio gauges, engines not delivering rated power, wrong wingflap setting, soft tire(s), dragging brake(s), parking brakes not having been released, etc.

SUMMARY

The object of the invention is to inform the pilot, during the takeoff roll, as to whether the aircraft's acceleration rate is on a schedule that will achieve V1 at the required certificated distance.

In the case of a rotary dial-type airspeed indicator, during the takeoff roll, the pilot is informed of the airspeed the aircraft should be at when acceleration is on schedule, by an additional needle in the airspeed indicator, which is herein referred to as the Howgozit needle.

As the aircraft accelerates during the takeoff roll, the airspeed needle will advance, and the Howgozit needle will also advance. When both needles are registering equally, i.e. one superimposed on the other, then the aircraft's acceleration rate is on schedule. Should the airspeed needle advance ahead of the Howgozit needle, then the aircraft's acceleration rate is better than planned. Should the airspeed needle lag behind the Howgozit needle, then the aircraft's acceleration rate is lagging behind the required schedule.

For distance information, a window in the face of the airspeed indicator will digitally display to the pilot how far in distance the aircraft is presently behind the takeoff roll schedule.

In the case of a tape-type airspeed indicator, the pilot is informed of the airspeed the aircraft should be at when acceleration is on schedule, by means of a needle electronically generated out of the lubber line of the Howgozit Airspeed Indicator, which is herein referred to as the Howgozit needle, as depicted in Sheet 4 of 4 of the Drawings.

As the aircraft accelerates during the takeoff roll, the Howgozit needle will point to the airspeed at which the aircraft should be at, at that particular moment.

If the aircraft is on acceleration schedule as planned, then the Howgozit needle will not be generated, and thus not seen. If however the aircraft is ahead of acceleration schedule, then the Howgozit needle will appear and point down out of the lubber line to the speed the aircraft should be at when on the planned acceleration schedule. On the other hand, if the aircraft is behind the acceleration schedule, as depicted in Sheet 4 of 4 of the Drawings, the Howgozit needle will be generated upward from the lubber line to the speed the aircraft should be at when on the planned acceleration schedule. The further behind schedule, the longer the Howgozit needle will be.

For distance information, a window in the face of the Howgozit Airspeed Indicator will digitally display to the pilot how far in distance the aircraft is presently behind the takeoff roll schedule.

BRIEF DESCRIPTION OF THE DRAWINGS

Sheet 1 of 4 is a speed-vs-time takeoff acceleration graph of an assumed aircraft under assumed conditions, which demonstrates that aircraft acceleration on takeoff is not uniform (i.e., not a straight-line variable) due to factors that vary the thrust and the drag at different speeds; such as, propeller aerodynamic slippage, jet ram effect, tire rolling friction, form and parasite drag.

Sheet 2 of 4 portrays the face of a dial-type Howgozit Airspeed Indicator (showing an aircraft indicating 118 kts, with a required airspeed of 140 kts, and 400 feet behind acceleration schedule).

Figure 1:
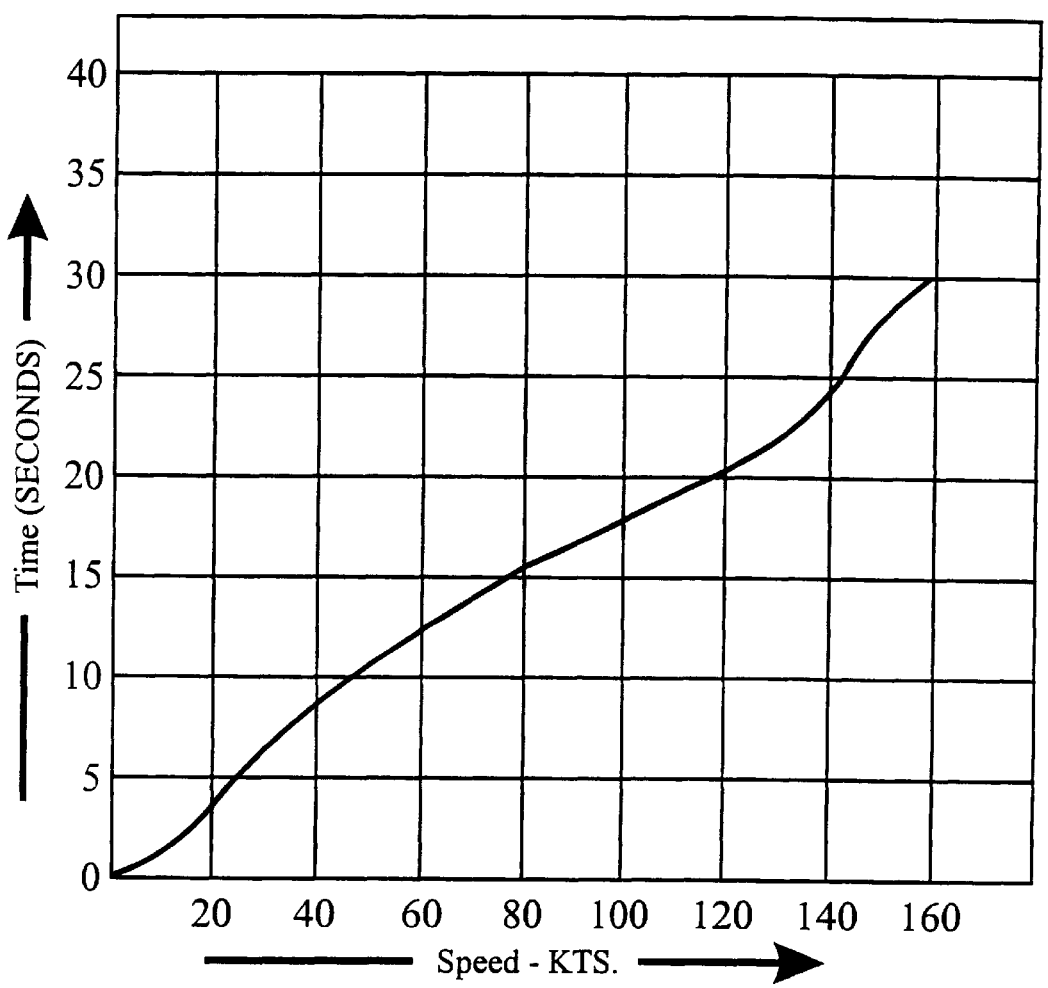
Figure 2:
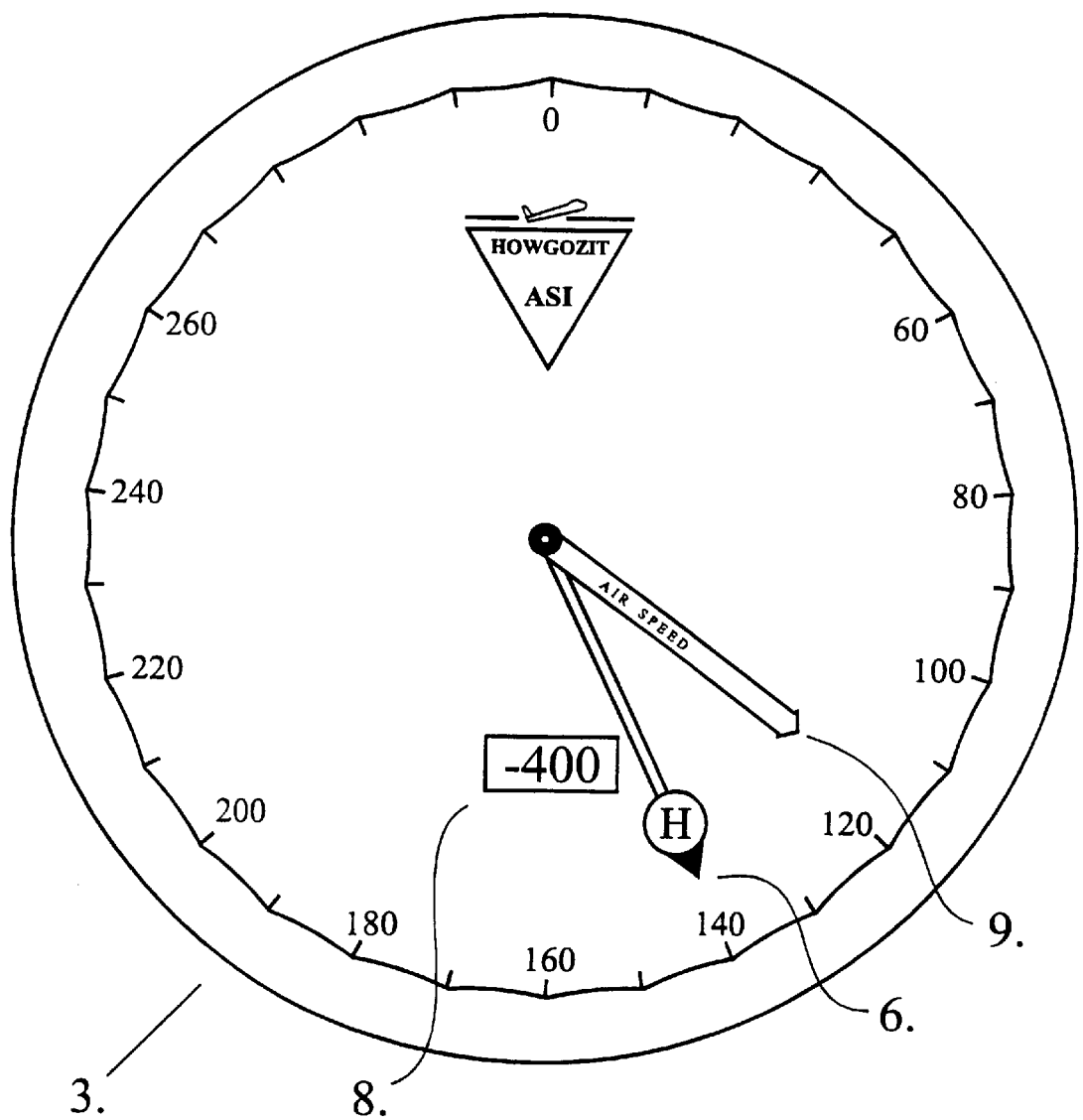
Figure 3:
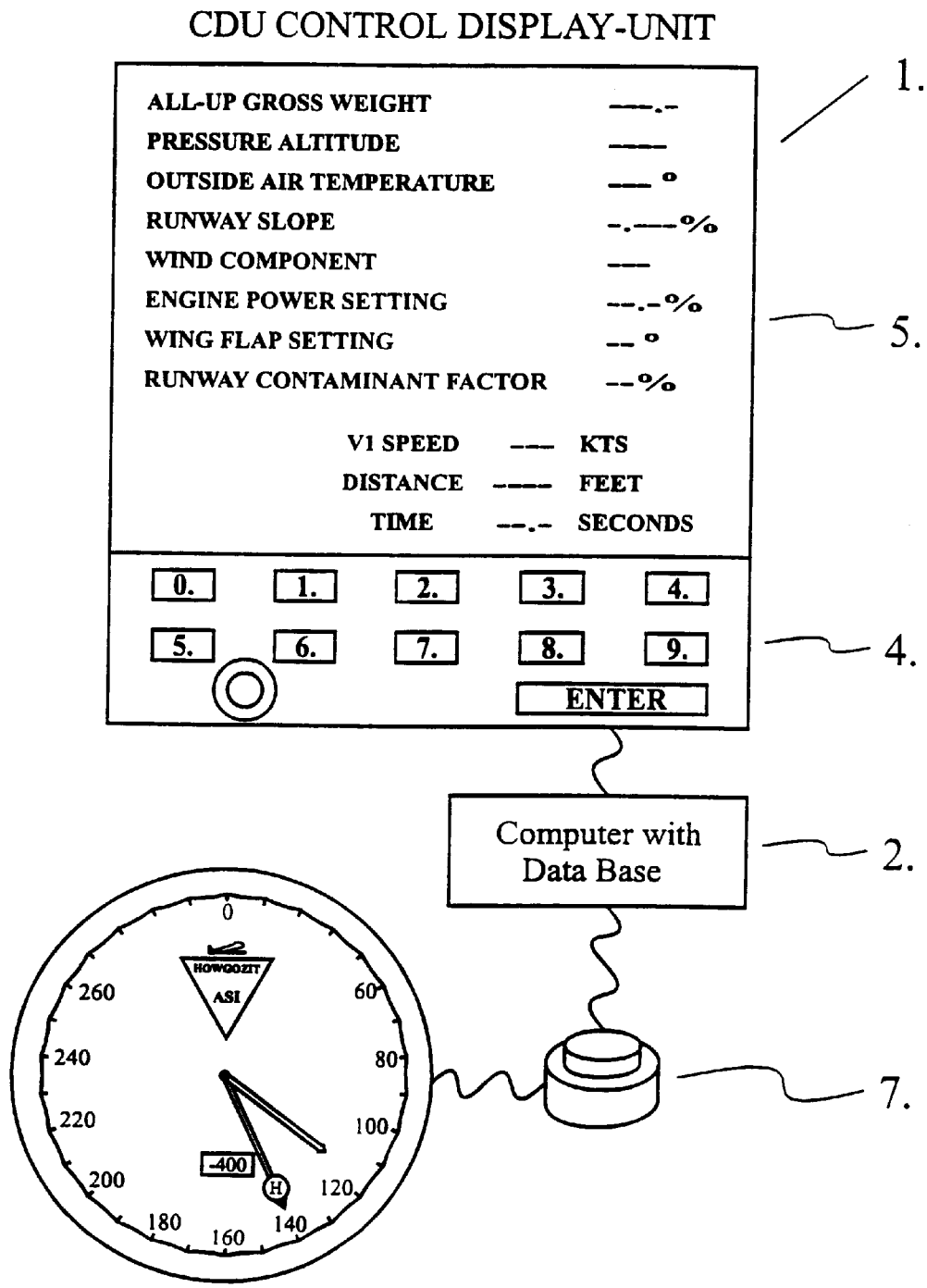
Figure 4:
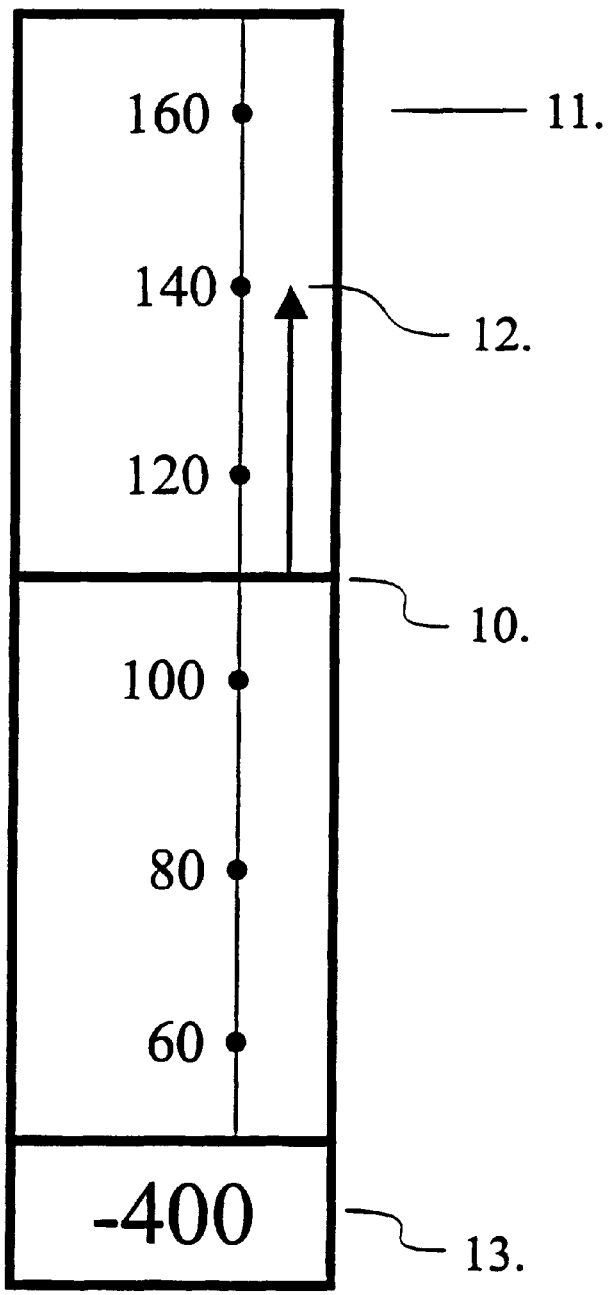

Sheet 3 of 4 portrays a schematic of the system components' interaction.

Sheet 4 of 4 portrays the face of a tape-type Howgozit Airspeed Indicator (showing an aircraft indicating 118 kts, with a required airspeed of 140 kts, and 400 feet behind acceleration schedule).

DETAILED DESCRIPTION OF THE PREFERRED EMBODIMENT

The basic components of the Howgozit Airspeed Indicator System are a CDU (1) Control-Display Unit, a Computer with Database (2), and a Howgozit Airspeed Indicator (3)(11).

The CDU Keyboard (4) allows the pilot to load the Computer (2) with the takeoff data pertaining to the planned takeoff, as guided by the first eight prompts in the CDU Display Window (5). The last three lines in the CDU Display Window (5) will then show computed V1 speed, runway distance required, and time required to accelerate to V1. In other words, one enters the aircraft all-up gross weight, airfield altitude, outside air temperature, runway slope, wind component, engine power setting, wing flap setting and a contingency for runway contaminants such as snow, slush or standing water.

It may be noted that aircraft that are presently equipped with FMC Systems may use their current CDU for the Howgozit Airspeed System.

The Database of the Computer (2) stores the speed-vs-time values of acceleration graph curves for the specific type and model of aircraft, under the variables that affect takeoff acceleration, i.e. as shown in the first eight prompts of the CDU Display Window (5).

The Howgozit Airspeed Indicator (3)(11) displays the actual speed plus the speed at which the aircraft should be at.

Rotary Dial-Type Airspeed Indicator

In the case of the rotary dial-type airspeed indicator, the Howgozit Airspeed Indicator (3) has two needles and a window (8). One needle is the conventional Airspeed needle (9), and the other is the Howgozit needle (6) which, during the takeoff roll, will point to the speed the aircraft should be at when its acceleration is on a schedule to achieve V1 speed at the anticipated distance.

If both the Airspeed needle (9) and the Howgozit needle (6) advance equally, then the aircraft is on acceleration schedule. If the Airspeed needle (9) advances ahead of the Howgozit needle (6), then the aircraft would be accelerating better than anticipated. However, if the Airspeed needle (9) lags behind the Howgozit needle (6) then the aircraft is lagging behind required acceleration, and the Window (8) will display by how much distance.

At V1 the Howgozit needle's (6) usefulness as such ceases, and it automatically returns to zero, or the start position.

A Start Button (7), to be operated at the start of the takeoff roll, starts the Howgozit needle (6) operation. The Computer (2), loaded with its eight prompts for takeoff performance, then governs the rate at which the Howgozit needle (6) progresses, based on time.

Tape-Type Airspeed Indicator

In a tape-type Airspeed Indicator (11) the Howgozit needle (12) may be incorporated as shown in Sheet 4 of 4 of the Drawings.

In this case the pilot is informed of the airspeed the aircraft should be at when acceleration is on schedule, by means of a needle electronically generated out of the lubber line or reference line (10) of the Howgozit Airspeed Indicator (11), which is herein referred to as the Howgozit needle (12), as depicted in Sheet 4 of 4, of the Drawings. As the aircraft accelerates during the takeoff roll, the Howgozit needle (12) will point to the airspeed at which the aircraft should be at, at that particular moment.

If the aircraft is on acceleration schedule as planned, then the Howgozit needle (12) will not be generated, and thus not seen. If however the aircraft is ahead of acceleration schedule, then the Howgozit needle (12) will appear and point down out of the lubber line (10) to the speed the aircraft should be at when on planned acceleration schedule. On the other hand, if the aircraft is behind the acceleration schedule, as depicted in Sheet 4 of 4 of the Drawings, the Howgozit needle (12) will be generated upward from the lubber line (10) to the speed the aircraft should be at when on planned acceleration schedule. The further behind schedule the longer the Howgozit needle (12) will be.

For distance information, a Window (13) in the face of the Howgozit Airspeed Indicator (11) will digitally display to the pilot, how far in distance the aircraft is presently behind the takeoff roll schedule.

A Start Button is also incorporated in the case of a tape-type Howgozit Airspeed Indicator, to be operated at the start of the takeoff roll. The computer, loaded with its eight prompts for takeoff performance, then commences governing the electronic generation of the Howgozit needle's (12) display, up to arrival at V1 speed.

What is claimed is:

1. An instrumentation system for use in aircraft, during the takeoff roll from standstill to V1 speed, that continuously displays a target airspeed at which the aircraft should be if it is meeting the acceleration required to be at V1 at the anticipated distance, wherein a related computer with a database stores information on curves of takeoff acceleration graphs of the type and model of said aircraft with respect to speed versus time on said takeoff roll as well as distance;

an actual airspeed display continuously displaying the actual speed of said aircraft wherein, during the takeoff roll up to V1 speed, said computer continuously controls the progressive movement of target airspeed display in said actual airspeed display, to display the target speed at which the aircraft should be if it is meeting the computer-stored acceleration curve based on time;

and a display for continuously displaying the computed distance that said aircraft is currently lagging behind when said actual speed is less than said speed at which said aircraft should be if it is meeting said computer-stored acceleration curves.

2. An instrumentation system as claimed in claim 1, further including an instrument panel having an indicator to continuously display said actual speed of said aircraft, and a needle to indicate said target speed.

3. An instrumentation system as claimed in claim 2 wherein said indicator comprises a reference line.

4. An airspeed display as indicated in claim 1 wherein said target and actual airspeeds are displayed on a rotary dial type airspeed indicator.

5. An airspeed display as claimed in claim 1 wherein said target and actual airspeeds are displayed on a tape type airspeed indicator.

6. An airspeed display as claimed in claim 1 wherein said actual airspeed is displayed by a reference line and said target airspeed is displayed by an arrow generated from said reference line.

7. An airspeed display as claimed in claim 1 wherein said target airspeed is no longer displayed when said aircraft reaches V1.

8. The display of claim 1 wherein said airspeed display is an electronically generated readout.

9. An instrument for use in aircraft, during the takeoff roll from standstill to V1 speed, that continuously displays a target airspeed at which the aircraft should be at if it is meeting the acceleration required to be at V1 at the anticipated distance, wherein a computer with a database stores information on curves of takeoff acceleration graphs of the types and model of aircraft with respect to speed versus time on said takeoff roll as well as distance;

an actual airspeed display continuously displaying the actual speed of said aircraft wherein, during the takeoff roll up to V1 speed, said computer continuously controls the progressive movement of target airspeed display in said actual airspeed display, to display the target speed at which the aircraft should be if it is meeting the computer-stored acceleration curves based on time;

a reference line against which said actual speed of said aircraft is displayed, and a needle to indicate said target speed;

and a window in said instrument for continuously displaying the computed distance that said aircraft is currently lagging behind when said actual speed is less than said speed at which said aircraft should be if it is meeting said computer-stored acceleration curves.

10. An instrument for use in an aircraft, during acceleration of the aircraft from 0 velocity to V1, for continuously monitoring actual velocity of the aircraft versus target velocity of the aircraft required to accelerate to V1 within an anticipated distance from a standstill position comprising:

(a) input means for entering parameters affecting an anticipated distance from the standstill position required to accelerate to V1;

(b) comprising means for calculating from said parameters;

(i) a V1 value for said aircraft;

(ii) anticipated distance from aid standstill position required to accelerate to V1;

(iii) time required to accelerate to V1; and (iv) target velocity continuously required to accelerate to V1 within said time required;

(c) means for operably storing said V1 value of said aircraft, anticipated distance from standstill position, time required to accelerate to V1, and target velocity continuously required to accelerate to V1 within said time required to accelerate to V1; and (d) means for continuously and simultaneously displaying and monitoring the actual velocity of the aircraft and the target velocity required to achieve V1, comprising a linear readout airspeed indicator having a reference line against which said actual velocity is displayed, and wherein an arrow generated from said reference line displays said target velocity;

(e) means for displaying continuously the actual distance said aircraft is lagging said aircraft's actual position behind an anticipated position determined by the anticipated distance from the standstill position required to accelerate to V1.

* * * * *